(12) United States Patent
Aruga (10) Patent No.: US 6,513,713 B1
(45) Date of Patent: Feb. 4, 2003

(54) MAGNETISM DETECTING APPARATUS AND MAGNETIC MATERIAL IDENTIFYING APPARATUS USING THE SAME

(75) Inventor: Fusayoshi Aruga, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 243 days.

(21) Appl. No.: 09/589,650

(22) Filed: Jun. 8, 2000

(30) Foreign Application Priority Data

Jun. 9, 1999 (JP) .......................................... 11-161876

(51) Int. Cl.$^7$ ................................................ G06K 7/08
(52) U.S. Cl. ........................................ 235/449; 235/493
(58) Field of Search .................................. 235/449, 493

(56) References Cited

U.S. PATENT DOCUMENTS 5,650,606 A * 7/1997 Baus ........................... 235/449

FOREIGN PATENT DOCUMENTS

DE    35 21 095      12/1986
EP    1 059 601 A2   12/2000

* cited by examiner

*Primary Examiner*—Harold I. Pitts
(74) *Attorney, Agent, or Firm*—Reed Smith LLP (57) ABSTRACT

A detecting apparatus for reading the magnetic strip on a card compensates for coercivity variations by employing two magnetizing coils wound in opposite senses on the magnetic poles and two detecting coils coupled to the magnetizing coils and which are also wound in opposite sense on the magnetic poles. Differential output from the detecting coils represents a shift from normal in the coercivity or permeability of the magnetic strip so as to permit compensation for shifts due to factors such as a warped card or dust intervening thereby permitting accurately identifying whether or not the magnetic strip on the card is a high coercive force type or a low coercive force type.

11 Claims, 9 Drawing Sheets

MAGNETISM DETECTING APPARATUS AND MAGNETIC MATERIAL IDENTIFYING APPARATUS USING THE SAME

BACKGROUND OF THE INVENTION

The present invention relates to a magnetism detecting apparatus which detects an object to be detected based on a change in a magnetic flux corresponding to the permeability of the object. Further, the present invention relates to a magnetic material identifying apparatus which identifies a magnetic material of the object to be detected using the magnetism detecting apparatus.

Conventionally, magnetic material identifying apparatus includes a card reader. In recent years, a higher coercive force is given to a magnetic strip formed on a card to improve reliability of data recorded thereon; accordingly, both high coercive force cards and low coercive force cards are intermingled (circulated) in the market. Hence, card readers are required to comprise a function which allows recording of data at a sufficient current corresponding to the various coercive forces of cards.

Therefore, based on the correlation between a coercive force and a permeability of a magnetic material, an applicant of the present invention applied for a grant of patent on a differential magnetic sensor which identifies a coercive force of a card by detecting a change in a magnetic flux corresponding to a permeability of a magnetic strip of the card.

However, further invention is required to the above invention. According to the above invention, the coercive force of a card is identified by detecting a change in a magnetic flux corresponding to the permeability of a magnetic strip; such a magnetic flux corresponding to the permeability of a magnetic strip is affected by the distance between the magnetic strip and the magnetic sensor (clearance). As a result, the coercive force of a card may not be accurately identified when the distance between the magnetic strip and the magnetic sensor is not maintained constant. For example, when a card is warped, the distance between the magnetic strips and the magnetic sensor is not constant when the card is inserted into the card reader. Also when dust adheres to the surface having a magnetic strip, the output of the sensor tends to be lower than normal. Accordingly, the change in the magnetic flux in these circumstances differs from normal conditions such that a coercive force of the card may be mistakenly identified.

Figure 6:
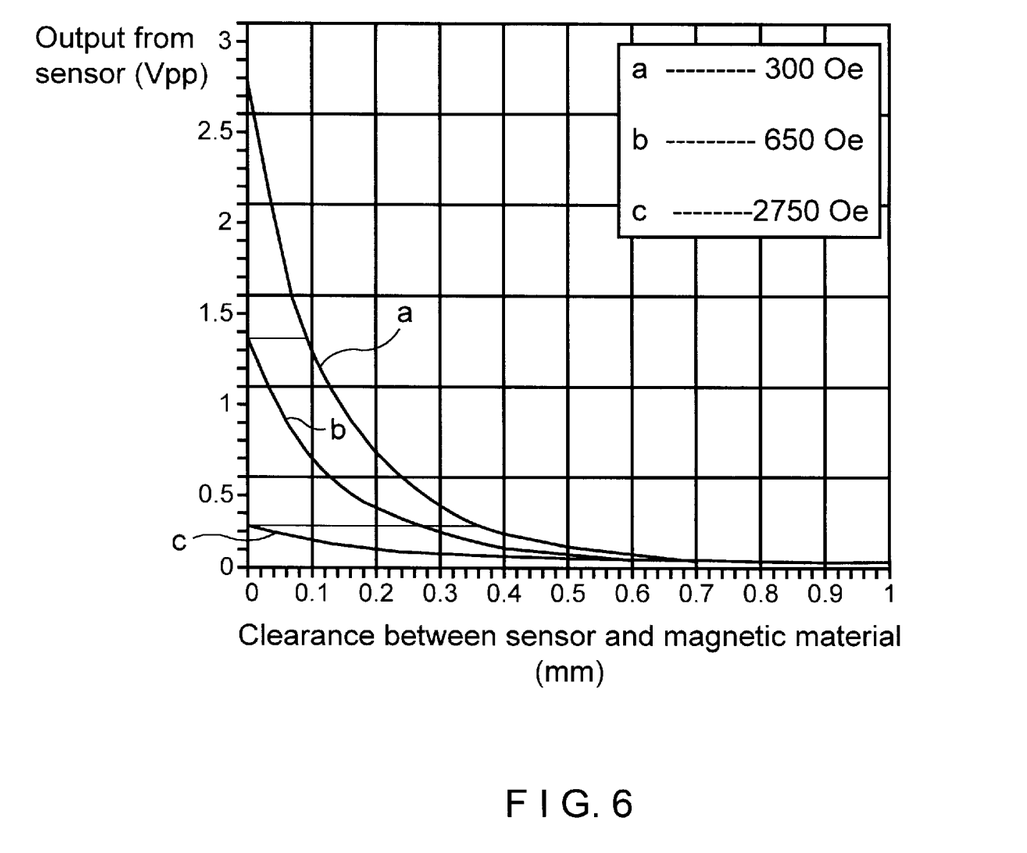
FIG. 6 is a graph showing the output from the magnetic sensor as a function of the distance between the magnetic strip on a card being read and the magnetic sensor.

FIG. 6 shows the relationship of the output from a magnetic sensor with the distance between the magnetic strip of a card and the magnetic sensor. Symbols therein indicate as follows: (a)=clearance characteristics of a card (medium) with a coercive force of 300 (Oe); (b)=clearance characteristics of a card with a coercive force of 650 (Oe); and (c)=clearance characteristics of a card with a coercive force of 2750 (Oe). For example, if the distance between the magnetic strip and the magnetic sensor is 0.1 mm when reading the card with 300 (Oe) wherein the magnetic strip and the magnetic sensor are completely in contact with each other, the output from the magnetic sensor as the card is identified is almost identical to the output for a card with 650 (Oe). As a result, the card with 300 (Oe) is mistakenly identified as a card with 650 (Oe). Also, if the distance between the magnetic strip and the magnetic sensor is more than 0.37 mm when reading a card with 300 (Oe), the card may be mistaken with a card with 2750 (Oe).

To solve the above issue, the present invention intends to provide a magnetism detecting apparatus which accurately identifies the coercive force of a magnetic material, such as a magnetic strip, and a magnetic material identifying apparatus using the same.

BRIEF DESCRIPTION OF THE DRAWINGS

In FIG. 3, the two coils 8 are shown as a single coil because they are in series without the center tap that exists between the two coils 9.

FIG. 11 is a side view showing another embodiment.

DESCRIPTION OF THE PREFERRED EMBODIMENTS

Figure 1A:
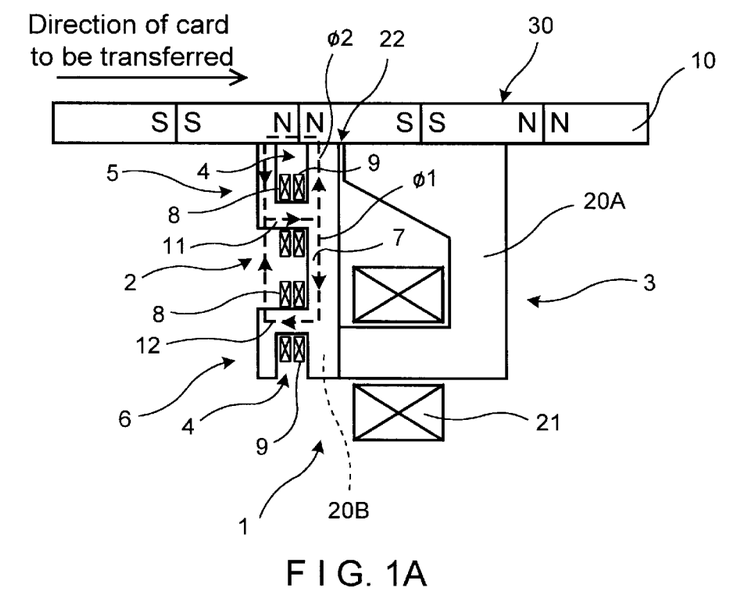
FIGS. 1(A) and 1(B) are side views of similar embodiments of the invention which function in an identical fashion. These two figures illustrate the geometrically close relationship between the magnetic sensor 2 and the magnetic head 3.
Figure 1B:
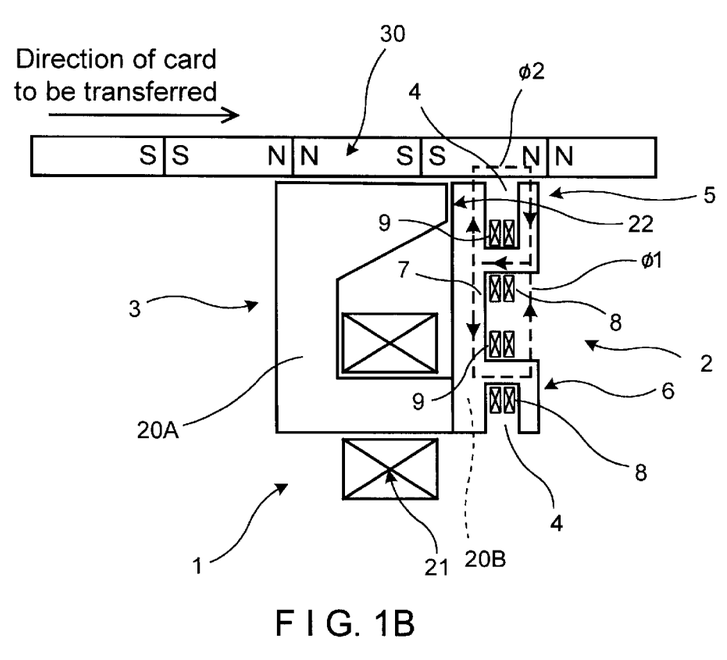

The following describes embodiments of a magnetism detecting apparatus and a magnetic material identifying apparatus using the same according to the present invention. FIGS. 1(A) and 1(B) show magnetism detecting apparatus 1 according to the present invention wherein magnetic sensor portion 2 and magnetic head portion 3 are adjacent to one another.

With reference to the embodiments of FIGS. 1A and 1B, there are two magnetizing coils 8. One of the magnetizing coils 8 is wound around the core 11 and the other magnetizing coil 8 is wound around the core 12. There are also two detecting coils 9. One of the detecting coils 9 is wound around core 11 ad the other is wound around core 12. The two magnetizing coils are wound in opposite sense directions from one another. The two detecting coils 9 are also wound in opposite sense directions from one another.

In FIGS. 1(A) and 1(B), the positions of magnetic sensor portion 2 and magnetic head portion 3 (or the direction of a card to be transferred) can be switched and there would be no change in their function.

Magnetic sensor portion 2 comprises two magnetic poles 5 and 6 which approximately form a U shape. Two magnetic poles 5 and 6 are connected on the side of magnetic head portion 3 via connecting portion 7 forming an approximate π (pi) shape. Each of magnetic poles 5 and 6 has a pair of projecting poles which sandwich gap portion 4; gap portions 4, 4 have an open end in the length direction of magnetic sensor portion 5. Magnetizing coil 8 and detecting coil 9 are wound around winding portions 11 and 12, formed with gaps 4, 4 of magnetic poles 5 and 6. In this embodiment, each gap portion 4 has a width of 0.5 mm. Also, magnetic poles 5 and 6 and connecting portion 7 are integrally formed of a highly coercive magnetic material such as a ferrite and sendust.

Magnetic sensor portion 2 is positioned at a magnetism detecting position of a card reader (magnetism detecting apparatus) as a magnetic material identifying apparatus where the magnetism of a card is detected. When card 30 as an object to be detected passes through a transferring path, magnetic material 10 forming a magnetic strip thereon tends to be closer to magnetic pole 5 than it. is to magnetic poles. Therefore, the magnetic flux in magnetic pole 5 changes differently than does the magnetic flux in magnetic pole 6. Detecting coil 9 detects the differential change in the magnetic flux in magnetic pole 5 in relation to magnetic pole 6. Then, based on the output of the detection of the magnetic material 10 of a magnetic strip on magnetic card 30, the card is identified as either a high coercive force card or a low coercive force card.

As described above, magnetizing coils 8 are wound around winding portion 11 of magnetic pole 5 and winding portion 12 of magnetic pole 6 in directions opposite from each other. Similarly, detecting coils 9 are wound around winding portion 11 of magnetic pole 5 and winding portion 12 of magnetic pole 6 in directions opposite from each other. As a result, directions of magnetic fluxes in magnetic poles 5 and 6 oppose each other such that close-looped magnetic flux $\phi 1$ is generated therein (see FIGS. 1(A) and 1(B)). In other words, detecting coils 9 are wound around the poles to be differential coils. One may establish magnetizing coils 8 to be differential coils.

Figure 3:
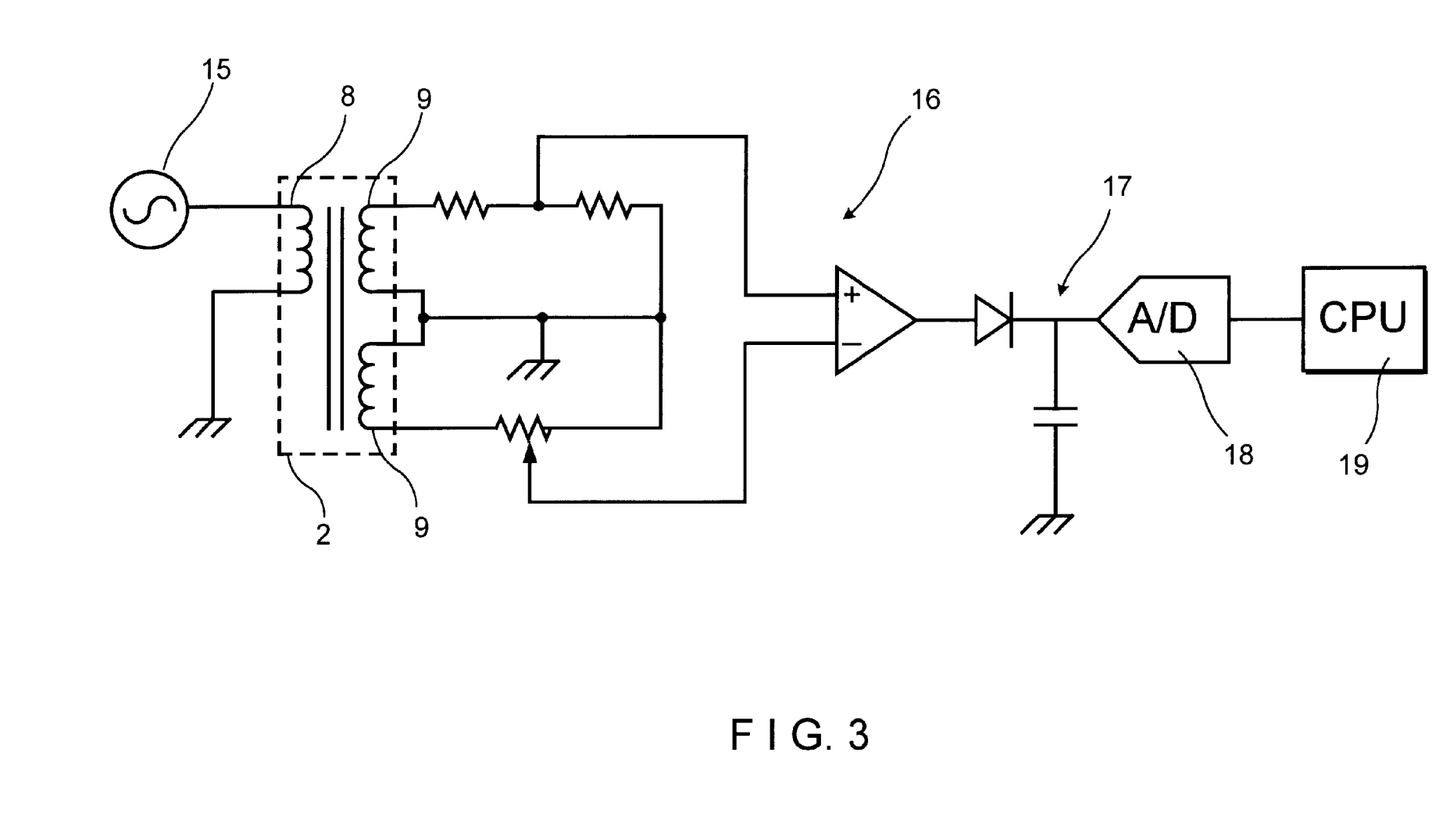
FIG. 3 is a schematic of the detecting circuit which is connected to the magnetic sensor 2.

The circuit shown in FIG. 3 is connected to magnetic sensor portion 2. The representation in FIG. 3 of the coil 8 is of two c oils in a series which are wound in opposite sense as are the two coils 9 shown in FIG. 3. In the case of the embodiment shown in FIGS. 1(A) and 1(B), magnetizing coil 8 is connected to alternating current power supply 15 to generate close-looped magnetic flux $\phi 1$ which passes through two magnetic poles 5 and 6. Two detecting coils 9, 9, which are magnetically coupled to magnetizing coils 8 and which are wound around magnetic poles 5 and 6, are placed with a bridging connection wherein the differential outputs of the bridge are connected to the plus "+" input terminal and the minus "−" input terminal of operational amplifier 16. Envelope detector circuit 17 is connected to the output terminal of operational amplifier 16. The output from envelope detector circuit 17 is converted to digital signals at analog-digital converter circuit 18 and is provided to CPU 19.

When magnetic material 10 of a magnetic strip on card 30 does not exist in the vicinity of magnetic sensor portion 2 such that the magnetic fluxes in magnetic poles 5 and 6 are identical, the magnetic fluxes in magnetic poles 5 and 6 are balanced and there is no differential output from detecting coils 9. When magnetic material 10 of the magnetic strip on card 30 approaches magnetic sensor portion 2 (see FIGS. 1(A) and 1(B)), magnetic flux $\phi 2$, which leaks from magnetic pole 5 towards magnetic material 10, is generated; consequently, the balance in the magnetic fluxes passing through magnetic poles 5 and 6 is lost. The degree of leakage of magnetic flux $\phi 2$ changes depending on the permeability of magnetic material 10 of the magnetic strip. The change in the degree of leakage results in differential signal output from the bridge-connected detecting coils 9, 9. The differential outputs, as shown in FIG. 3, are rectified by envelope detector circuit 17 after being amplified by operational amplifier 16. Thereafter, the analog signals are converted to digital signals by analog-digital converter circuit 18 and are provided to CPU 19 as output signals corresponding to the permeability of magnetic material 10 of the magnetic strip. There is a constant relationship between the permeability of magnetic material 10 of the magnetic strip on card 30 and the coercive force. Thus, the coercive force of magnetic material can be identified based on the outputs from detecting coils 9 by confirming the output values from detecting coils 9 corresponding to the coercive force of magnetic material 10 in advance.

In other words, winding portions 11 and 12 and connecting portion 7 in magnetic sensor portion 2 are positioned to form an approximate n shape. Magnetizing coils 8, 8 are wound around each of winding portions 11 and 12 such that magnetic flux $\phi 1$, which is generated when electricity flows in magnetizing coils 8, 8, becomes a close loop as passing through winding portion 11, connecting portion 7 and winding portion 12. On the other hand, detecting coils 9, 9 are wound therearound to be differential coils. When magnetic material 10 of a magnetic strip on card 30 approaches magnetic sensor portion 2, a part of magnetic flux $\phi 1$ leaks towards a loop formed of magnetic pole 5 and magnetic material 10, generating magnetic flux $\phi 2$ therein. Magnetic flux $\phi 2$ depends on the permeability of magnetic material 10 of the magnetic strip. Therefore, magnetic sensor portion 2 can operate on the area of magnetic material 10 on which data are recorded without the effects of a magnetic flux strong enough to damage the data recorded on magnetic material 10.

As shown in FIGS. 1(A) and 1(B), magnetic head portion 3 is configured of: inductive head cores 20A and 20B as magnetic core portions; and magnetic signals regenerating coil 21 which is wound around the bottom end of inductive head core 20A. Gap 22 is formed at the top end of inductive head core 20 for reading magnetic signals recorded on magnetic material 10 of the magnetic strip. Formation of gap 22 will be discussed later. Magnetic head portion 3 is to read magnetic signals recorded on magnetic material 10 by detecting a magnetic flux of magnetic material 10 with magnetic signal regenerating coil 21.

Figure 8A:
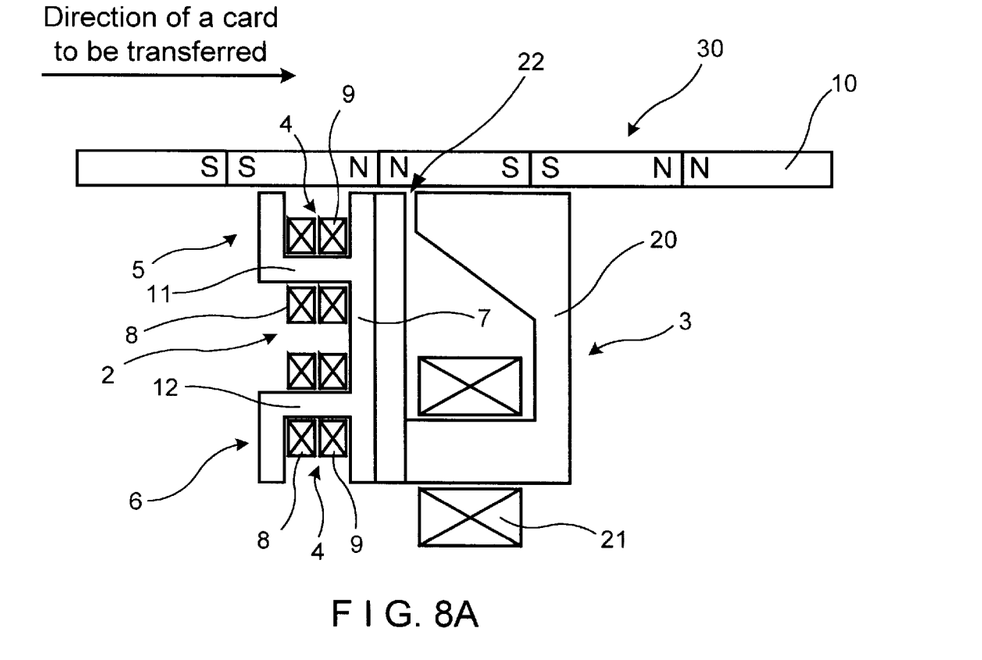
FIGS. 8(a) and 8(b) are side views of a further embodiment of this invention.
Figure 8B:
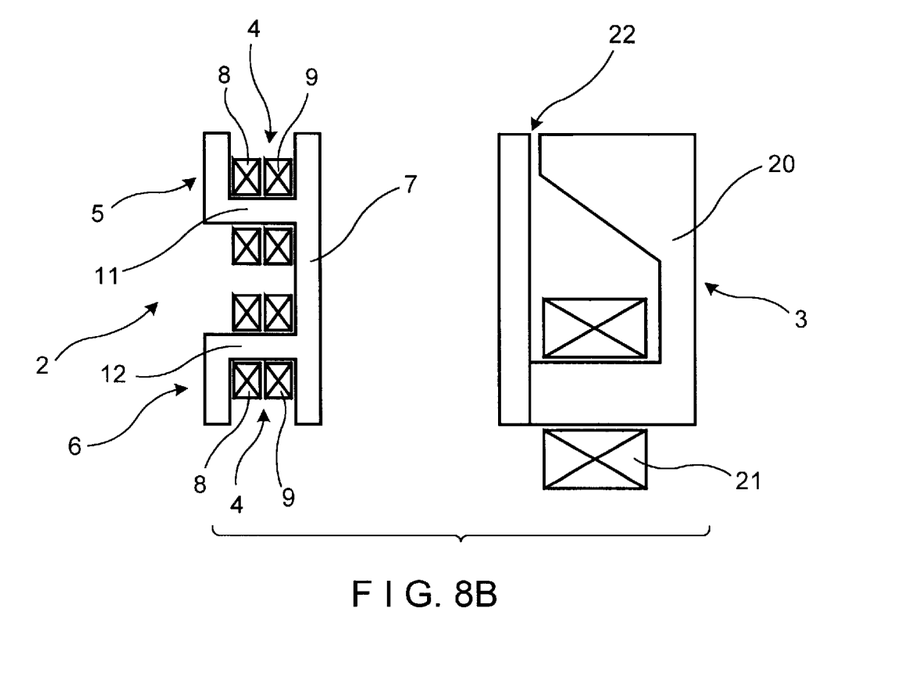

Magnetic head portion 3 is formed adjacent to magnetic sensor portion 2 such that they can be arranged to be placed in case 31 together. Also, magnetic core portions, forming magnetic poles 5 and 6 of magnetic sensor portion 2, can be partially integrated with inductive head cores 20A and 20B forming magnetic head portion 3. For example, according to the embodiment shown in FIGS. 1(A), 1(B) and 4, the magnetic core portions forming magnetic poles 5 and 6 of magnetic sensor portion 2 are integrally formed with inductive head core 20B. More specifically, both ends of connecting portion 7 are extended to form magnetic poles 5 and 6 while the extended ends also form a part of inductive head core 20B. Also, gap 22 is formed between inductive head cores 20A and 20B. However, such integration does not have to be achieved by sharing the cores. One may achieve integration therein by providing a configuration in which separately formed magnetic sensor portion 2 and magnetic head portion 3 are supported by a common flat spring (not shown), as shown in FIG. 8(*b*); also, one may integrate those two parts as shown in FIG. 8(*a*).

Figure 4:
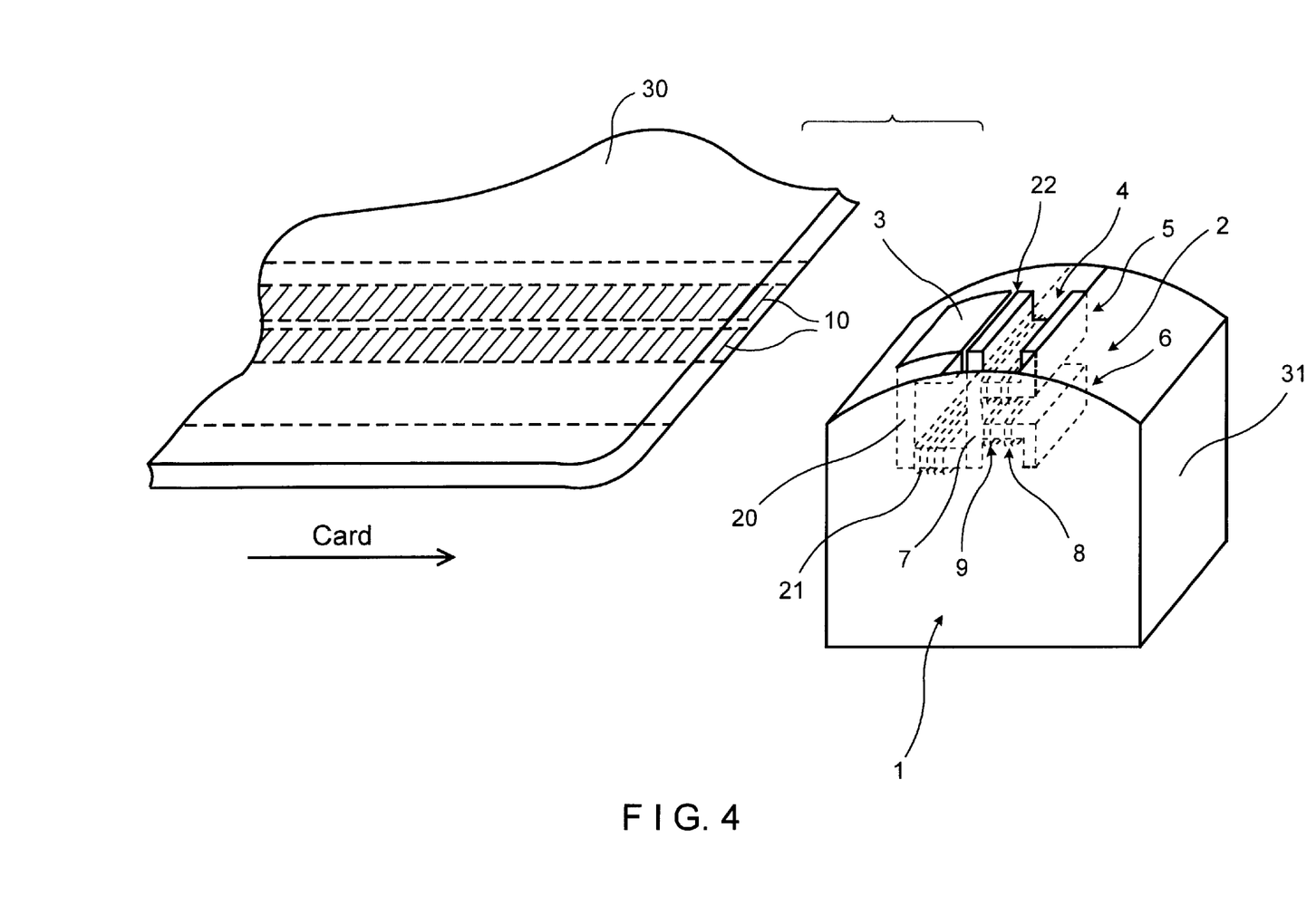
FIG. 4 is an oblique view showing an example of a detecting apparatus 1 having the sensor 2 and head 3 and showing the relationship between a card 30 having magnetic elements 10 which are to be passed over the detecting apparatus for the purpose of being read.

Gap 22 for reading magnetic signals shown in FIGS. 1(A), 1(B) and 4 is formed with the top portion of inductive head core 20A and the magnetic core portions forming magnetic poles 5 and 6 of magnetic sensor portion 2. As shown in FIG. 1, gap 22 is almost perpendicular to the direction of the magnetic field recorded on magnetic material 20. The width of gap 22 is about 30 μm, which is largely different from the width of gap portion 4 of magnetic sensor portion 2 (about 0.5 mm). One may establish the width of gap 22 and the width of gap portion 4 of magnetic sensor portion 2 to be the same if keen accuracy is not required for reading out magnetic signals.

As shown in FIGS. 1(A), 1(B) and 4, magnetic sensor portion 2 and magnetic head portion 3 are stored in case 31 together; also, the top surface of magnetic pole 4 of magnetic sensor portion 2 and the top surface of inductive head core 20A of magnetic head portion 3 form a contact surface continuous to magnetic material 10 of the magnetic strip on card 30.

Figure 2:
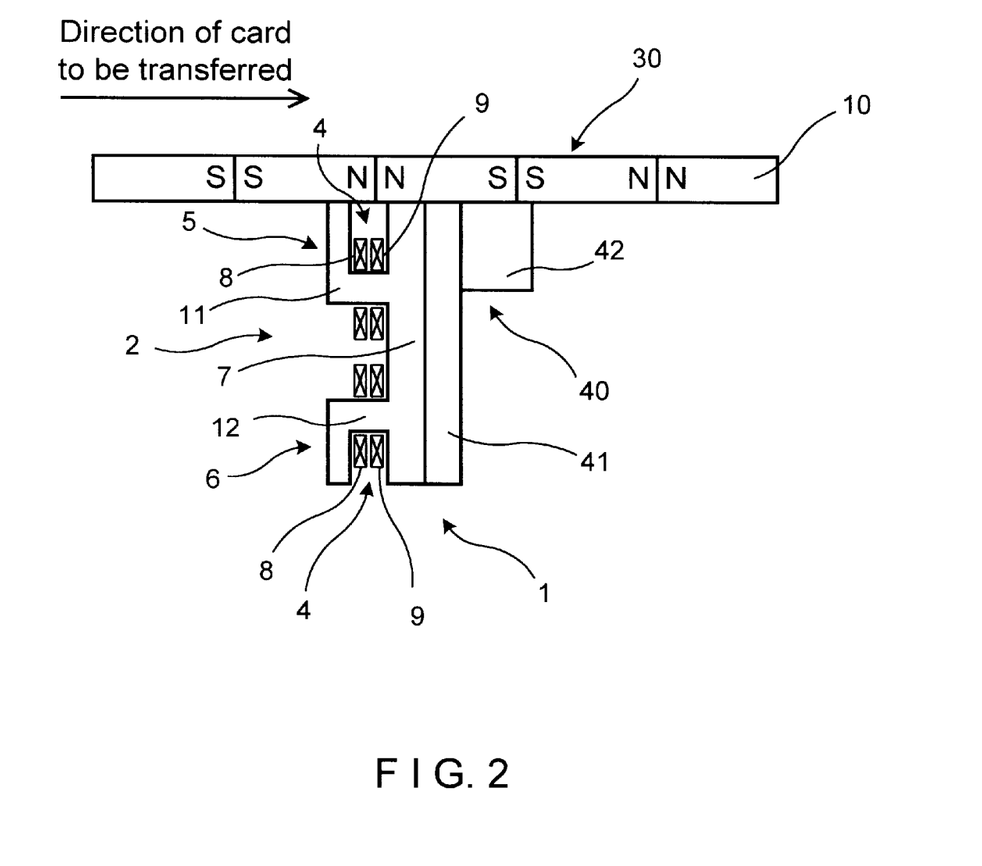
FIG. 2 is a side view of a second embodiment of this invention employing a magnetoresistance element in the magnetic head 40.
Figure 7:
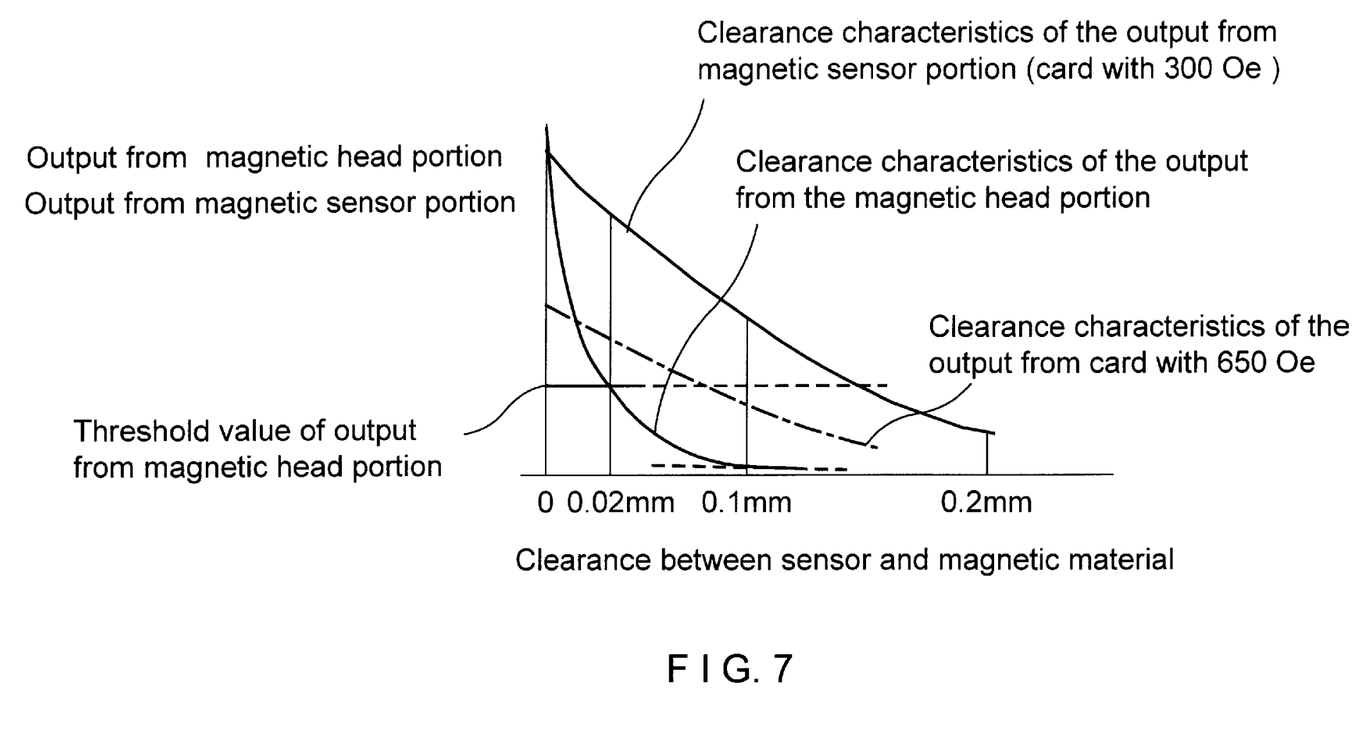
FIG. 7 is a graph showing the relationship of the outputs from the magnetic sensor portion and the magnetic head portion as a function of the distance between the magnetic strip on a card and the magnetic sensor.

As shown in FIG. 7, the output from magnetic head portion 3 of magnetic sensor portion 2 changes depending on the clearance between the magnetic strip of card 30 and the above contact surface. Therefore, whether the clearance between the magnetic strip of card 30 and the contact surface exists in magnetic sensor portion 2 can be detected based on the size of a magnetic signal as the output signal from magnetic head portion 3 by integrating magnetic sensor portion 2 and magnetic head portion 3, as shown in FIGS. 1(A), 1(B) and 2, or by forming magnetic sensor portion 2 and magnetic head portion 3 to be supported by a common spring and the like to provide integrated motions. The following describes such configurations.

As shown in FIG. 7, the output from magnetic sensor portion 2 smoothly becomes smaller while the output from magnetic head portion 3 drastically drops with an increase in the clearance between the magnetic strip of card 30 and the contact surface. In the case of a card having a coercive force of 300 (Oe), the output from magnetic sensor portion 2 is constantly larger than the output from magnetic head portion 3.

Accordingly, if the output from magnetic head portion 3 in relation to the above clearance is larger than a given value ("threshold value" hereafter), the output from magnetic sensor portion 2 is confirmed to be a value which is obtained under a condition with a clearance value for the threshold value or less. For example, the threshold value of the output from magnetic head portion 3 is established to be an output value obtained at a clearance value of 0.02 mm; if the output value from magnetic sensor portion 2 is larger than the threshold value, one can confirm that the output value from magnetic sensor portion 2 is obtained under a condition with a clearance value of 0.02 mm or less.

As described above, the coercive force of a magnetic material may be mistakenly identified when the clearance is large. However, using the above integral formation of magnetic head portion 3 and magnetic sensor portion 2, one may confirm that the output from magnetic sensor portion 2 is obtained under a condition with a given clearance value or less (a normal clearance value) based on a detected output value from magnetic head portion 3; consequently, the coercive force of the magnetic material can be accurately identified. Hence, the above threshold value should be established within a range in which the coercive force of the magnetic material can be accurately identified. For example, when the clearance is 0.1 mm as shown in FIG. 6, there is a possibility that one may mistakenly identify a card having 300 (Oe) as a card having 650 (Oe). Therefore, one should establish the threshold value of magnetic head portion 3 to be higher than the output from magnetic head portion 3 with a clearance value of 0.1 mm, or more preferably, to be higher than the output from magnetic head portion 3 with a clearance value of 0.2 mm.

Figure 5:
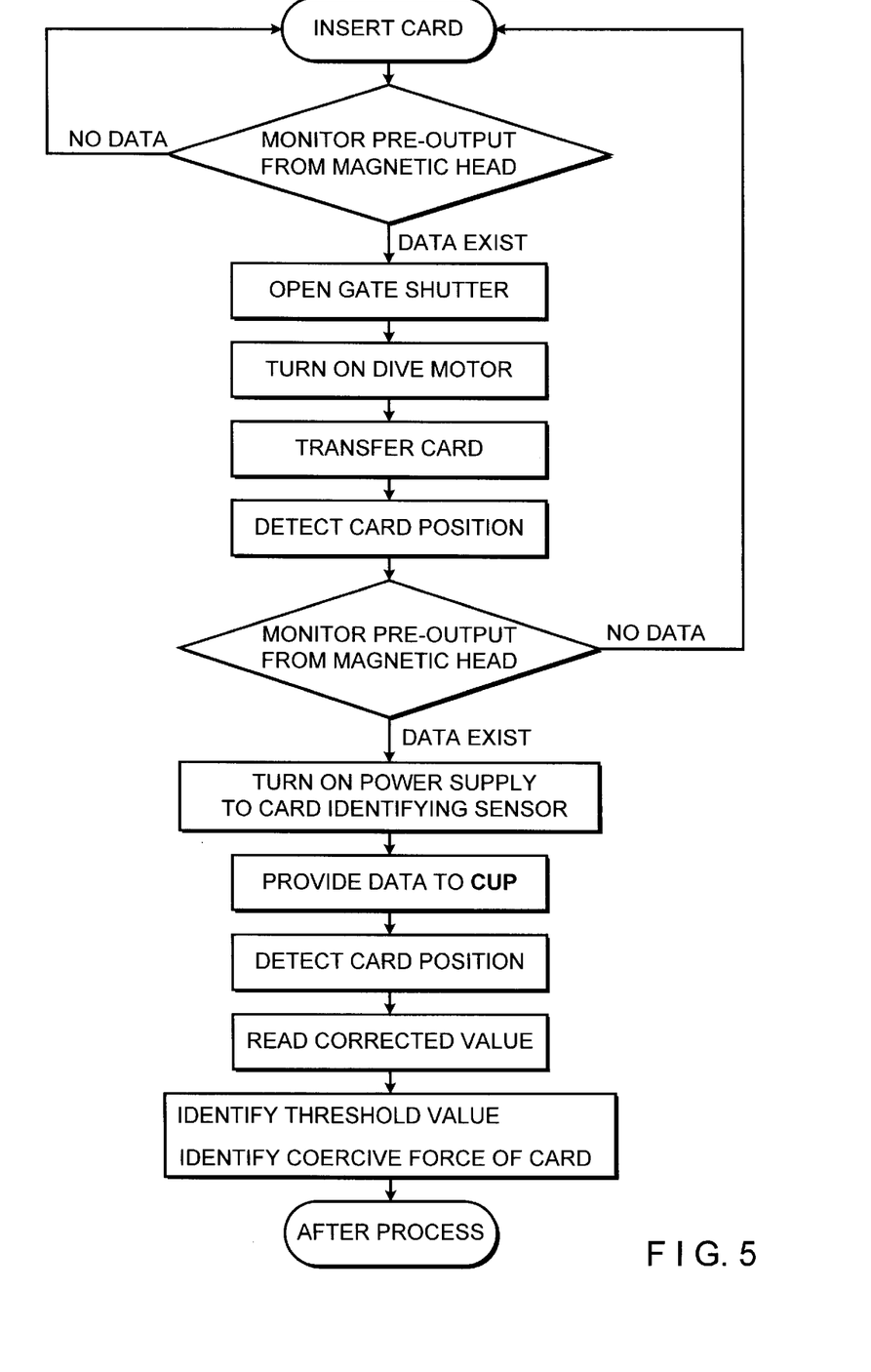
FIG. 5 is a flow chart showing the operation of the embodiments shown in FIGS. 1 through 4.

The following describes operation of the above embodiment. In this embodiment, magnetism detecting apparatus 1 is supposedly positioned before a shutter of a card insertion slot. Herein, as shown in FIGS. 4 and 5, when a user inserts card 30 into the card insertion slot (not shown in the figure), only whether the output signal from card 30 exists is detected (first time) by magnetic head portion 3 wherein the threshold value is established to be low because only whether a magnetic output exists needs to be detected herein by magnetic head portion 3; in other words, the output from magnetic head portion 3 is monitored. If the output signal of card 30 is not detected by magnetic head portion 3, the shutter remains closed such that card 30 is not taken into the inside of the card reader via the card insertion slot.

On the other hand, if a magnetic output signal is detected by magnetic head portion 3, the shutter opens, and card 30 is transferred to a magnetism detecting position by a drive motor for transferring of a card (not shown in the figure) while the position of card 30 is detected by a position detecting means. Thereafter, the output signal of card 30 is detected (second time) for identifying the coercive force by magnetic head portion 3.

Herein, the first detection of an output signal by magnetic head portion 3 merely detects whether the output signal exists; however, the second detection of the output signal by magnetic head portion 3 detects whether the output from magnetic head portion 3 is higher than the threshold value. If the output from magnetic head portion 3 is smaller than the threshold value, it is confirmed that a clearance larger than expected occurs between the magnetic head portion and the card; therefore, card 30 is returned to the card insertion slot without detecting the kind of the card, or performing only operations other than reading out of the data recorded on the card.

On the other hand, if the output from magnetic head portion 3 is higher than the threshold value, the power supply to magnetic head portion 3 is turned off and the power supply to magnetic sensor portion 2 (card identifying sensor) is turned on.

Accordingly, a current flows to magnetizing coil 8 of magnetic sensor portion 2 wherein a magnetic flux in magnetic pole 5 changes in relation to another magnetic flux in magnetic pole 6 by magnetic material 10 of a magnetic strip on card 30. This change in the magnetic flux in magnetic pole 5 is detected by detecting coil 9; then, the detection data is provided to CPU 19 as an output signal with a size corresponding to the permeability of magnetic material 10 of the magnetic strip on card 30 (see FIG. 3).

Note that this case may be that the power supply to magnetic sensor portion 2 is turned on while the power supply to magnetic head portion 3 keeps turning on. In this case, output from magnetic sensor portion 2 mixes into output from magnetic head portion 3. However, output from sensor portion 2 can pick up itself due to passing the mixed output through kinds of an electric circuit of a frequency filter.

Thereafter, the position of card 30 is detected by a position detecting means. When the position of card 30 is detected to be passing the magnetism detecting position of magnetism detecting apparatus 1, magnetic sensor portion 2 reads a value for a condition without a card as a corrected value. Based on the corrected value, the coercive force of magnetic material 10 is identified using the output signal which has a size corresponding to the permeability of magnetic material 10 and which is provided to CPU 19. Then, data are written onto the magnetic strip on card 30 by a data recording/regeneration magnetic head formed in the card reader. Magnetic head portion 3 can be used not only for reading out of the data but also for writing of the data.

Figure 9:
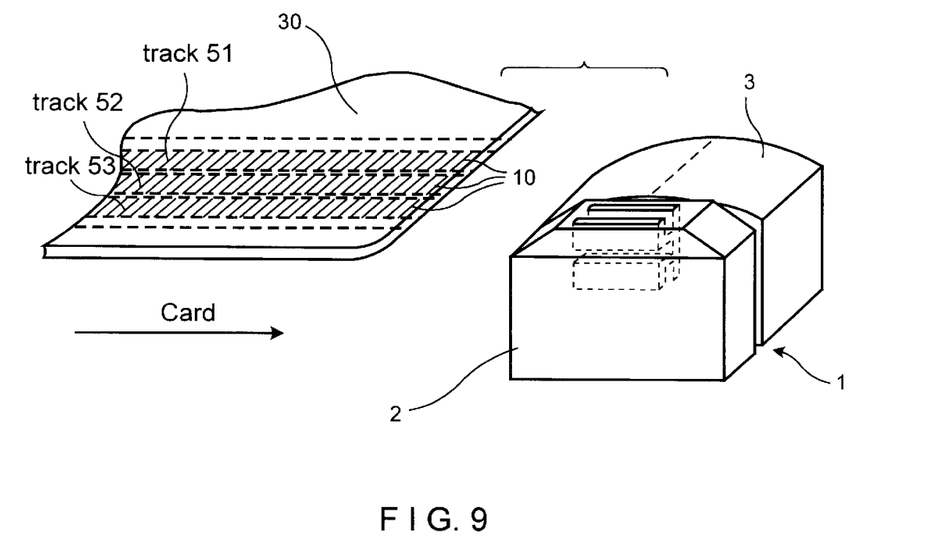
FIG. 9 is an oblique view of an example of a magnetic head portion in a card reader and a card having magnetic material to be identified by the card reader.

In the above embodiment, at least a part of the magnetic core portion of magnetic sensor portion 2 and a part of the magnetic core portion of magnetic head portion 4 are integrally formed; however, as shown in FIG. 9, magnetic sensor portion 2 and magnetic head portion 3 can be separately placed in a case wherein those cases are in contact with each other. In FIG. 9, magnetic material 10 of the magnetic strip on card 30 is divided into three tracks wherein tracks 51 and 52 pass over magnetic head portion 3 while track 53 passes over magnetic sensor portion 2.

Figure 10:
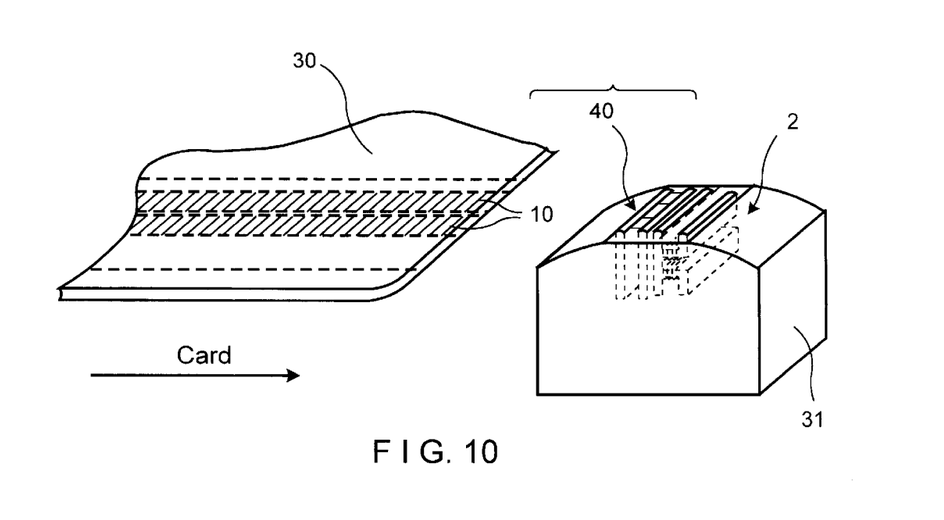
FIG. 10 is an oblique view of an example of a magnetic head portion of a card reader and a card having magnetic material to be identified.

Also, inductive head cores 20A and 20B are used in magnetic head portion 3 of the above embodiment. However, magnetic head portion 40 having an MR element (magneto resistance element) can be used as shown in FIG. 2. Magnetic head portion 40 comprises: glass substrate 41 which is mounted to a core portion of magnetic sensor portion 2; glass substrate 42 which is mounted to a part of glass substrate 41; and an MR element which is placed between glass substrate 41 and glass substrate 42. FIG. 10 shows an embodiment in which magnetic head portion 40 and magnetic sensor portion 2 are formed integrally and placed in case 31. The MR element can be placed between the core portion of magnetic sensor portion 2 and glass substrate 41. In this case, glass substrate 42 is not needed.

As shown in FIG. 11, a single magnetizing coil 8 may be wound around winding portion 11 of magnetic pole 5 and winding portion 12 of magnetic pole 6. Note detecting coils 9 are wound around winding portion 11 of magnetic pole 5 and winding portion 12 of magnetic pole 6 in directions opposite from each other such as shown in FIG. 1(A), 1(B).

Effects Of The Invention

According to the present invention, a magnetism detecting apparatus comprises:
a magnetizing coil and a detecting coil which are wound around two magnetic poles having a gap portion wherein a magnetic flux in one of the magnetic poles changes in relation to the other magnetic pole;
a magnetic sensor portion which identifies a magnetic material used with an object to be detected by detecting a change in the magnetic flux in one of the magnetic poles with the detecting coil; and
a magnetic head portion which reads out magnetic signals recorded on the magnetic material of the object to be detected wherein the magnetic sensor portion and the magnetic head portion are integrally formed.

Therefore, the output from the magnetic sensor portion can be confirmed to be a value obtained under a condition with a normal clearance value based on the output from the magnetic head portion; consequently, the coercive force of the magnetic material can be accurately identified. Also, the magnetic sensor portion and the magnetic head portion are integrally formed such that the frequency of the object to be detected and the magnetic head portion coming into contact with each other can be reduced; as a result, deterioration due to jitters and the like can be prevented.

Also, the present invention provides a configuration in which the magnetic sensor portion and the magnetic head portion are placed in a case wherein a contact surface continuous to the object to be detected is formed. Hence, the frequency of the object and the magnetic head portion coming into contact with each other can be reduced; as a result, deterioration due to jitters and the like can be prevented.

Moreover, according to the present invention, the magnetic head portion comprises a gap for reading magnetic signals recorded on the object to be detected wherein the width of the gap portion of the magnetic sensor portion is different from the width of the gap of the magnetic head portion for reading magnetic signals. Those gaps with appropriate widths provide sufficient detection.

Also, the present invention provides a configuration in which at least a part of the magnetic core portion forming the two magnetic poles of the magnetic sensor portion and a part of the magnetic core portion forming the magnetic head portion are integrated; hence, the cost can be reduced.

In addition, the present invention provides a magnetism detecting apparatus comprising:
a magnetizing coil and a detecting coil which are wound around two magnetic poles having a gap portion wherein a magnetic flux in one of the magnetic poles changes in relation to the other magnetic pole;
a magnetic sensor portion which identifies a magnetic material of a magnetic strip on a card by detecting a change in the magnetic flux in one of the magnetic poles with the detecting coil; and
a magnetic head portion which reads out magnetic signals recorded on the magnetic material of the card wherein the magnetic sensor portion and the magnetic head portion are integrally formed.

Therefore, the output from the magnetic sensor portion can be confirmed to be a value obtained under a condition with a normal clearance value based on the output from the magnetic head portion; consequently, the coercive force of the magnetic material can be accurately identified. Also, the magnetic sensor portion and the magnetic head portion are integrally formed such that the frequency of the card coming into contact with the magnetic head portion and the like can be reduced; as a result, deterioration due to jitters and the like can be prevented.

Further, the present invention provides a configuration in which the magnetic sensor portion and the magnetic head portion are placed in a case wherein a contact surface continuous to the card is formed. Also, whether a clearance exists between the card and the contact surface is detected based on the size of magnetic signals from the magnetic head portion. Therefore, the output from the magnetic sensor portion can be confirmed to be a value obtained under a condition with a normal clearance value based on the output from the magnetic head portion; consequently, the coercive force of the magnetic material can be accurately identified.

What is claimed is:
1. A magnetism detecting apparatus comprising:
a magnetizing coil and a detecting coil which are wound around two magnetic poles having a gap portion wherein a magnetic flux in one of said magnetic poles changes in relation to the other magnetic pole;
a magnetic sensor portion which identifies a magnetic material used with an object to be detected by detecting a change in said magnetic flux in one of said magnetic poles with said detecting coil; and
a magnetic head portion which reads out magnetic signals recorded on said magnetic material of said object to be detected wherein said magnetic sensor portion and said magnetic head portion are adjacent to one another.

2. A magnetism detecting apparatus according to claim 1 in which said magnetic sensor portion and said magnetic head portion are placed in a case wherein a contact surface continuous to said object to be detected is formed.

3. A magnetism detecting apparatus according to claim 1 in which said magnetic head portion has a gap for reading magnetic signals recorded on said object to be detected wherein the width of said gap portion of said magnetic sensor portion is different from the width of said gap of said magnetic head portion.

4. A magnetism detecting apparatus according to claim 1 in which said detecting coil comprises first and second portions wound in opposite sense and wherein the differential output from said first and second detecting coils corresponding to the coercivity of whatever magnetic material object is placed adjacent to one of said sensor gaps.

5. A magnetism detecting apparatus according to claim 1 in which at least a part of a magnetic core portion, forming said two magnetic poles of said magnetic sensor portion, and a part of a magnetic core portion, forming said magnetic head portion, are integrated.

6. A magnetic material identifying apparatus comprising a magnetism detecting apparatus which comprises:
   a magnetizing coil and a detecting coil which are wound around two magnetic poles having a gap portion wherein a magnetic flux in one of said magnetic poles changes in relation to the other magnetic pole;
   a magnetic sensor portion which identifies a magnetic material used with an object to be detected by detecting a change in said magnetic flux in one of said magnetic poles with said detecting coil; and
   a magnetic head portion which reads out magnetic signals recorded on said magnetic material of said object to be detected wherein said magnetic sensor portion and said magnetic head portion are adjacent to one another.

7. A magnetic material identifying apparatus according to claim 6 in which said object to be detected is a card wherein said magnetic material identifying apparatus identifies a magnetic material of a magnetic strip formed on said card.

8. A magnetic material identifying apparatus according to claim 6 in which said magnetic sensor portion and said magnetic head portion are placed in a case wherein:
   a contact surface continuous to said card is formed; and
   whether a clearance exists between said card and said contact surface is detected based on the size of magnetic signals from said magnetic head portion.

9. A magnetism detecting apparatus comprising:
   a magnetic sensor having first and second magnetic poles, each of said poles having a sensor gap portion,
   first and second magnetizing coils connecting in series and wound in opposite sense around said first and second magnetic poles,
   first and second detecting coils wound around said magnetic poles and magnetically coupled to said first and second magnetizing coils,
   the differential output from said first and second detecting coils corresponding to the coercivity of whatever magnetic material object is placed adjacent to one of said sensor gaps.

10. The apparatus of claim 9 wherein said first and second detecting coils are wound in opposite sense and have a bridging connection to detect differential flux from said magnetizing coils.

11. The apparatus of claim 10 further comprising:
   a magnetic read head adjacent to said sensor,
   said head having a read gap between said sensor and said read head for reading magnetic signals from the magnetic material object placed adjacent to one of said sensor gaps,
   said read gap being substantially smaller than said sensor gaps.

* * * * *